(No Model.)  2 Sheets—Sheet 2.

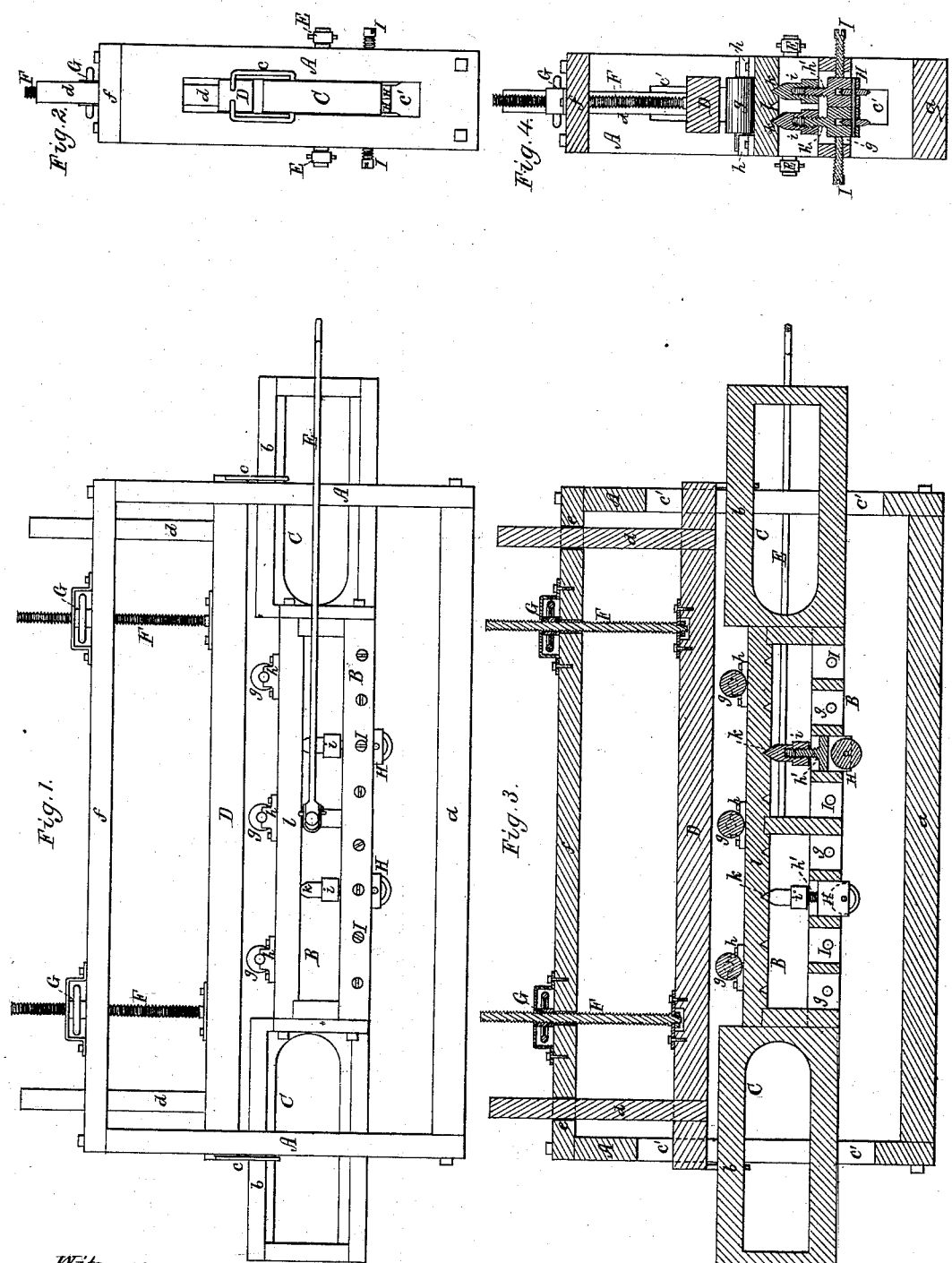

A. McDONALD.
MACHINE FOR DRESSING STONE.

No. 262,967.  Patented Aug. 22, 1882.

Witnesses.
S. N. Piper
E. D. Pratt

Inventor,
Alexander McDonald.
by R. H. Eddy atty.

UNITED STATES PATENT OFFICE.

ALEXANDER McDONALD, OF CAMBRIDGE, MASS., ASSIGNOR TO THE McDONALD STONE CUTTING MACHINE COMPANY, OF NASHUA, N. H.

MACHINE FOR DRESSING STONE.

SPECIFICATION forming part of Letters Patent No. 262,967, dated August 22, 1882.

Application filed May 29, 1882. (No model.)

*To all whom it may concern:*

Be it known that I, ALEXANDER McDONALD, of Cambridge, in the county of Middlesex, of the State of Massachusetts, have invented a new and useful Improvement in Machines for Dressing Stone; and I do hereby declare the same to be described in the following specification, and represented in the accompanying drawings, of which—

Figure 5:
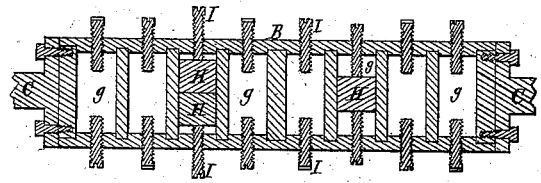
Figure 6:
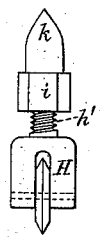
Figure 7:
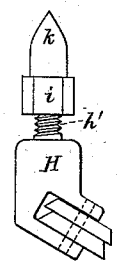
Figure 8:
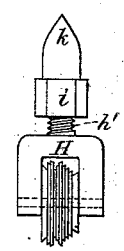

Figure 1 is a front elevation, Fig. 2 an end elevation, Fig. 3 a vertical and longitudinal section, and Fig. 4 a transverse section, of a machine embodying my invention, the nature of which is defined in the claims hereinafter presented. Fig. 5 is a horizontal section of the cutter-carriage of such machine. Figs. 6, 7, and 8 are edge views of some of the adjustable cutter-carriers with their cutters, to be described.

In Figs. 1, 2, 3, and 4, A denotes a frame, on whose lower part or base, $a$, the stone to be dressed is to rest, or upon a suitable carriage or platform movable laterally upon or across such base. Within the frame A, and over its bed, is a cutter stock or carriage, B, it being provided at each of its opposite ends with a slotted guide or support piece, C, whose upper straight portion, $b$, extends through one of two staples or yokes, $c$, projecting downward from a horizontal rail or bar, D. This rail and the guides C extend through vertical slots $c'$ $c'$ in the end portions of the frame A, and are guided in their movements by such slots. The bar D is also provided with guide-posts $d$ $d$, that extend upward from it through holes $e$ $e$ in the top bar, $f$, of the frame A. When the machine is at work the bar D rests on a series of friction-wheels, $g$, whose journals are supported in suitable boxes, $h$, fixed on the top of the cutter stock or carriage B.

A forked connection-rod, E, pivoted to the said carriage and spanning it and the frame A, serves, when reciprocated by any suitable motor, to impart to the cutter-carriage a reciprocating rectilinear movement.

Screws F F extend upward from the bar D through the top bar of the frame A, and also through nuts G G applied to the said frame, so as to be immovable vertically though capable of being revolved on the screws. By means of such nuts and screws the bar D may be depressed or raised, as may be required.

The cutter-carriage in its lower part is furnished with a series of slots, $g$ $g$, to receive the several adjustable cutter-carriers, H. The cutters of the carriers are steel disks sharpened at their edges, they being arranged in the carriers so as to freely revolve therein. Each carrier has a screw, $h'$, projecting upward from it into a nut, $i$, provided with a conical or tapering point, $k$, which bears against the bottom of the upper bar, $l$, of the carriage B, or in a step made in such bar.

Screws I, screwed into the carriage and entering each of the stalls at its opposite ends, bear against the cutter-carrier or set of carriers in the stall, and serve to adjust or move such laterally or change them therein, the pivoted nut of each cutter serving, with the screw thereof, to depress the cutter-carrier in the carriage.

From the above it will be seen that the machine described not only contains means of moving its cutters forward and backward across a stone, but has means of adjusting such cutters to the stone, and of depressing or raising each of the cutter-carriers, as circumstances may require.

The machine also has means of raising or depressing the rail or bar over and supporting the cutter-carriage. After a stone may have been dressed once it may be further dressed by depressing the said bar and next causing the stone to again be suitably moved while the cutter-carriage may be reciprocated.

By using cutters arranged in a carrier as shown in Fig. 7 the vertical edge of a stone may be dressed, or by employing cutters arranged as shown in Fig. 8 a molding may be cut in the stone.

In said Fig. 7 the cutters are represented as projecting from one side of the carrier with their axes inclined to that of the carrier, the said carrier being furnished with a screw and its pivoted nut, such as hereinbefore described.

I do not herein claim disks for cutting and dressing stone; but

What I claim as my invention is as follows, viz:

1. The cutter-carriage provided with the series of stalls, in combination with the cutter-carriers, the carriers in each stall being adjustable vertically and horizontally independently of those in the other stalls, as set forth.

2. The cutter-carriage provided with the cutter-carrier receiving-stalls and their cutter-carrier adjusting or clamping screws, as described, in combination with cutter-carriers arranged in such stalls and provided with screws and pivoted nuts, as specified, to operate in and with the carriage, as explained.

ALEXANDER McDONALD.

Witnesses:
R. H. EDDY,
E. B. PRATT.